United States Patent
Cai et al.

(10) Patent No.: US 11,448,771 B2
(45) Date of Patent: Sep. 20, 2022

(54) METHOD AND APPARATUS FOR EVALUATING DATA, DEVICE, AND COMPUTER-READABLE STORAGE MEDIUM

(71) Applicant: BEIJING BAIDU NETCOM SCIENCE AND TECHNOLOGY CO., LTD., Beijing (CN)

(72) Inventors: Renlan Cai, Beijing (CN); Wenjie Liu, Beijing (CN); Xiaotao Li, Beijing (CN); Pengfei Yuan, Beijing (CN); Liang Peng, Beijing (CN); Shiyu Song, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 266 days.

(21) Appl. No.: 16/814,452

(22) Filed: Mar. 10, 2020

(65) Prior Publication Data

US 2021/0072404 A1 Mar. 11, 2021

(30) Foreign Application Priority Data

Sep. 5, 2019 (CN) .......................... 201910838298.6

(51) Int. Cl.
*G01S 19/23* (2010.01)
*G01S 19/47* (2010.01)

(52) U.S. Cl.
CPC .............. *G01S 19/23* (2013.01); *G01S 19/47* (2013.01)

(58) Field of Classification Search
CPC .................................. G01S 19/23; G01S 19/47
(Continued)

(56) References Cited

U.S. PATENT DOCUMENTS

| 2015/0166072 | A1* | 6/2015 | Powers ............... G08G 1/0129 701/1 |
| 2016/0169701 | A1 | 6/2016 | Yang et al. |

(Continued)

FOREIGN PATENT DOCUMENTS

| CN | 101743453 A | 6/2010 |
| CN | 103777218 A | 5/2014 |

(Continued)

OTHER PUBLICATIONS

European Search Report Application No. EP 20162156.2 dated Sep. 17, 2020.

(Continued)

*Primary Examiner* — Harry K Liu
(74) *Attorney, Agent, or Firm* — von Briesen & Roper, s.c.

(57) ABSTRACT

Embodiments of the present disclosure provide a method and apparatus for evaluating data, a device, and a computer-readable storage medium in the field of autonomous driving. The method may include: generating, at least based on satellite navigation data related to a vehicle, a reference position and posture data set of the vehicle; generating, at least based on a part of the satellite navigation data, a test position and posture data set of the vehicle, the accuracy of the test position and posture data set being lower than that of the reference position and posture data set; obtaining a revised position and posture data set for the test position and posture data set; and evaluating, based on the reference position and posture data set and the revised position and posture data set, a correction performance for the test position and posture data set.

20 Claims, 5 Drawing Sheets

(58) Field of Classification Search
USPC .................................................. 342/357.62
See application file for complete search history.

(56) References Cited

U.S. PATENT DOCUMENTS

2017/0176196 A1* 6/2017 Powers ............... B60W 40/068
2017/0219360 A1   8/2017 Cui et al.

FOREIGN PATENT DOCUMENTS

| | | | | | |
|---|---|---|---|---|---|
| CN | 205749912 U | * | 11/2016 | ............ | G01S 19/26 |
| CN | 106525046 A | | 3/2017 | | |
| CN | 108732603 A | * | 11/2018 | ............ | G01S 17/89 |
| CN | 108885268 A | * | 11/2018 | ............ | G01S 19/08 |
| CN | 109307877 A | | 2/2019 | | |
| CN | 110161534 A | | 8/2019 | | |
| CN | 110174105 A | * | 8/2019 | ............ | G01S 19/08 |
| EP | 3106897 A1 | | 12/2016 | | |
| JP | 2019082441 A | * | 5/2019 | ............ | G01S 19/26 |
| JP | 2019164415 A | * | 9/2019 | | |

OTHER PUBLICATIONS

CN Office Action related to CN 201910838298.6 dated Jan. 21, 2021.

* cited by examiner

METHOD AND APPARATUS FOR EVALUATING DATA, DEVICE, AND COMPUTER-READABLE STORAGE MEDIUM

CROSS-REFERENCE TO RELATED APPLICATIONS

This application claims priority to Chinese Patent Application No. 201910838298.6, filed on Sep. 5, 2019, titled "Method and apparatus for evaluating data, device, and computer-readable storage medium," which is hereby incorporated by reference in its entirety.

TECHNICAL FIELD

Embodiments of the present disclosure mainly relate to the field of autonomous driving, and more specifically to a method and apparatus for evaluating data, a device, and a computer-readable storage medium.

BACKGROUND

High-precision positioning technology is an important part of autonomous driving technology, and is also the basis for path planning, control decision making, and perception by autonomous vehicles. Conventional positioning schemes mainly include a positioning scheme based on a global navigation satellite system (GLASS)/inertial measurement unit (IMU), a positioning scheme based on laser radar, and a positioning scheme based on a camera.

With the development of autonomous vehicle technology, it is very important to use the combination of GNSS/IMU and laser radar for mapping. The combination of the above three technologies may provide an accurate map for an autonomous vehicle to ensure correct driving of the vehicle. However, there are still many problems that need to be solved in the process of mapping through the combination of GNSS/IMU and laser radar.

SUMMARY

According to embodiments of the present disclosure, a solution to evaluating data is provided.

In a first aspect, an embodiment of the present disclosure provides a method for evaluating data. The method includes generating, at least based on satellite navigation data related to a vehicle, a reference position and posture data set of the vehicle. The method further includes generating, at least based on a part of the satellite navigation data, a test position and posture data set of the vehicle, accuracy of the test position and posture data set being lower than accuracy of the reference position and posture data set. The method further includes obtaining a revised position and posture data set for the test position and posture data set. The method further includes evaluating, based on the reference position and posture data set and the revised position and posture data set, a revision performance for the test position and posture data set.

In a second aspect, an embodiment of the present disclosure provides an apparatus for evaluating data. The apparatus includes a first reference position and posture data set generating module, configured to generate, at least based on satellite navigation data related to a vehicle, a reference position and posture data set of the vehicle; a test position and posture data set generating module, configured to generate, at least based on a part of the satellite navigation data, a test position and posture data set of the vehicle, accuracy of the test position and posture data set being lower than accuracy of the reference position and posture data set; a first revised position and posture data set obtaining module, configured to obtain a revised position and posture data set for the test position and posture data set; and a first evaluating module, configured to evaluate, based on the reference position and posture data set and the revised position and posture data set, a revision performance for the test position and posture data set.

In a third aspect, an embodiment of the present disclosure provides an electronic device, including: one or more processors; and a storage apparatus configured to store one or more programs, wherein the one or more programs, when executed by the one or more processors, cause the one or more processors to implement the method according to the first aspect.

In a fourth aspect, an embodiment of the present disclosure provides a computer-readable storage medium, storing a computer program thereon, where when the program is executed by a processor, the method according to the first aspect is implemented.

It should be appreciated that the description of the summary is not intended to limit the key or important features of the embodiments of the present disclosure, or to limit the scope of the present disclosure. Other features of the present disclosure will become readily comprehensible through the following description.

BRIEF DESCRIPTION OF THE DRAWINGS

The above and other features, advantages and aspects of various embodiments of the present disclosure will become more apparent with reference to the accompanying drawings and detailed descriptions below. The same or similar reference signs in the drawings denote the same or similar elements.

DETAILED DESCRIPTION OF EMBODIMENTS

Figure 1:
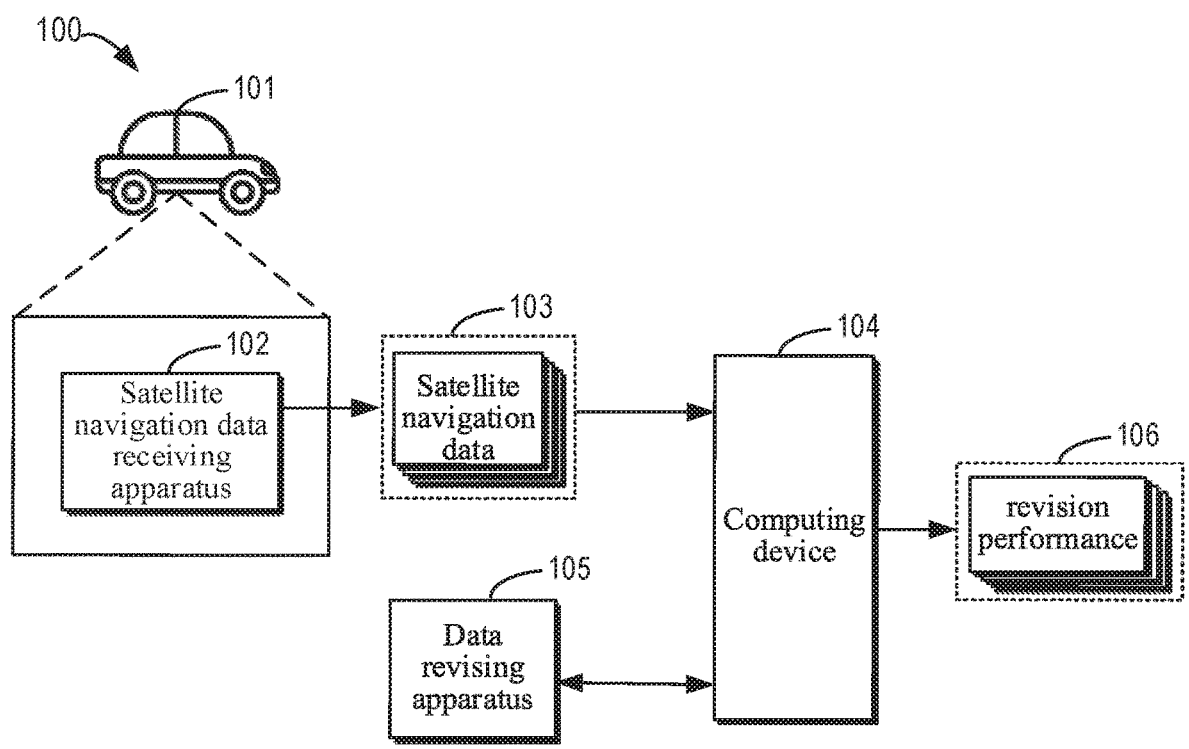
FIG. 1 shows a schematic diagram of an example environment 100 for evaluating data according to an embodiment of the present disclosure.

Embodiments of the present disclosure will be described in more detail below with reference to the accompanying drawings. Although some embodiments of the present disclosure are shown in the drawings, it should be appreciated that the present disclosure may be implemented in various forms and should not be construed as limited to the embodiments described here, and these embodiments are provided in turn for more thorough and complete understanding of the present disclosure. It should be understood that the drawings and embodiments of the present disclosure are merely illustrative, but are not intended to limit the scope of the present disclosure.

In the description of the embodiments of the present disclosure, the term "include" and the like should be interpreted as open inclusion, i.e., "include but not limited to". The term "based on" should be interpreted as "at least partially based on". The term "an embodiment" or "the embodiment" should be interpreted as "at least one embodiment". The terms "first", "second" and the like may indicate different or identical objects. Other explicit and implicit definitions may also be included below.

In the use of autonomous vehicles, the laser radar/visual mapping capability in a weak GNSS environment is one of the important technologies for mass production of autonomous vehicles. Therefore, it is important to evaluate the mapping capability in the weak GNSS environment. At present, conventional surveying and mapping methods are often used, for example, a total station is used to measure wires, or a high-level laser scanner is erected to obtain coordinates of key points in a scenario, or the like, thereby obtaining a high-precision reference map. Then, the data obtained from a collection vehicle is revised by a mapping module to obtain a test map. The revised test map is compared with a reference map to verify the accuracy of mapping, thereby determining the performance of a cartography application.

However, this verification method is highly specialized, time-consuming and labor-intensive, requires more devices, and therefore is not easy to implement. Accordingly, the conventional weak GNSS condition laser radar or visual mapping has the problems of uncertain verification, high verification cost and the like.

According to embodiments of the present disclosure, a solution to evaluating data is proposed. This method proposes to acquire GNSS data, and then fuse the GNSS data with IMU data and wheel speedometer data to obtain a reference position and posture data set of a collection vehicle. Then, the scenario of the GNSS data is edited, that is, data of part of satellites in the GNSS data is selected to obtain GNSS inputs under different conditions, and the data is fused with the IMU data and the wheel speedometer data to obtain a test position and posture of the collection vehicle. The test position and posture data set obtained by the weak GNSS is input into a revising apparatus (e.g., a mapping module) to obtain a revised position and posture data set. The correction performance of the revising apparatus is determined by comparing the revised position and posture data set with a reference position and posture data set. Through the above method, the correction performance may be accurately evaluated, the use of devices is reduced while the time is saved, and the verification cost is effectively reduced.

The embodiments of the present disclosure will be described below with reference to the accompanying drawings. Herein, the term "position and posture" refers to the position and posture of an object in a particular coordinate system. For example, in a two-dimensional coordinate system, the position and posture of the object may be expressed by, for example, two-dimensional coordinates and a heading angle, or the like. In a three-dimensional coordinate system, for example, the position and posture of the object may be expressed by, for example, three-dimensional coordinates, a pitch angle, a heading angle, a roll angle, or the like.

FIG. 1 shows a schematic diagram of an exemplary environment 100 in which the embodiments of the present disclosure may be implemented. The environment 100 generally includes a vehicle 101 having a satellite navigation data receiving apparatus 102 thereon. The vehicle 101 refers to any vehicle or other object to be positioned. However, it should be understood that this is for illustration purpose only and is not intended to limit the scope of the present disclosure. The embodiments of the present disclosure may be similarly applied to other moving objects.

The satellite navigation data receiving apparatus 102 is used to receive signals transmitted by a satellite navigation system to generate satellite navigation data 103. In some embodiments, the satellite navigation system is a global navigation satellite system. The global navigation satellite system is a space-based radio navigation positioning system that can provide users with all-weather three-dimensional coordinates and speed and time information at any place of the earth surface or the near-earth space. The GNSS may be US GPS, Russian GLONASS, EU GALILEO or China Beidou satellite navigation system. The example is only used to describe the present disclosure, but not to specifically limit the present disclosure. The satellite navigation system may be any satellite system capable of implementing navigation functions.

The environment 100 further includes a computing device 104. The computing device 104 is any electronic device capable of processing data, including but not limited to a mobile phone (e.g., a smart phone), a laptop computer, a portable digital assistant (PDA), an electronic book (e-book) reader, a portable game console, a portable media player, a game console, a set-top box (STB), a smart television (TV), a personal computer, a laptop computer, a vehicle-mounted computer (e.g., a navigation unit), a multi-processor system, consumer electronics, a mainframe computer, a distributed computing environment including any one of the systems or devices, and the like.

The computing device 104 may generate a reference position and posture data set of the vehicle based on the received satellite navigation data 103. In some embodiments, the satellite navigation data 103 is obtained by a collection vehicle from a scenario with good GNSS signals and rich reference points. For example, the scenario is a wide road with less obstruction. In some embodiments, the computing device also receives inertial measurement unit data and wheel speedometer data measured by an inertial measurement unit and a wheel speedometer in the vehicle 101. The computing device 104 obtains the reference position and posture data set by fusing the satellite navigation data 103, the inertial measurement unit data, and the wheel speedometer data. Alternatively or additionally, the computing device further obtains point cloud data acquired by a laser radar/vision camera of the vehicle 101, and may map, based on the reference position and posture data set, the point cloud data into the same coordinate system as the position and posture data to obtain a reference point cloud data set. In some embodiments, the computing device 104 may process 100 position and posture data per second.

The computing device 104 may further select data of part of satellites from the satellite navigation data 103 to obtain part of satellite navigation data. The part of satellite navigation data obtained in this way may be used to simulate data in a scenario with poor GNSS signals. Using such data, a test position and posture data set of the vehicle may be generated. Then, the computing device 104 obtains a revised position and posture data set based on the test position and posture data set. For example, the computing device 104 may send the test position and posture data set to a data revising apparatus 105, and the data revising apparatus 105 corrects the test position and posture data set and provides the correction result to the computing device 104.

In some embodiments, the data revising apparatus 105 is used to revise an input position and posture data set, and output a revised position and posture data set. In some embodiments, the data revising apparatus 105 may include a cartography application, such as a laser radar/visual cartography application. Alternatively or additionally, the cartography application also generates a map based on GNSS data and data acquired by a laser radar/vision camera, for example, generates a clear map using reference GNSS data and data acquired by a laser radar/vision camera, or generates unclear map data using tested GNSS data and data from a laser radar/vision camera. FIG. 1 shows that the data revising apparatus 105 and the computing device 104 are separate components. The example is only used to describe the present disclosure, but not to specifically limit the present disclosure. The data revising apparatus 105 may alternatively be in the computing device 104.

After the revised position and posture data set is obtained, the data revising apparatus 105 sends the revised position and posture data set to the computing device 104, and the computing device 104 then compares the reference position and posture data set with the revised position and posture data set to determine a correction performance 106 of the data revising apparatus 105.

Although not shown in FIG. 1, the vehicle 101 may also have an inertial measurement unit, a wheel speedometer, a laser radar, and a vision camera. The inertial measurement unit is an apparatus used to measure the three-axis posture angle (or angular rate) and acceleration of the vehicle. In some embodiments, the inertial measurement unit includes three single-axis accelerometers and three single-axis gyroscopes. The accelerometers are used to detect acceleration signals of the object on three independent axes of a carrier coordinate system, and the gyroscopes detect angular velocity signals of a carrier relative to the navigation coordinate system. The wheel speedometer is used to measure the speed of the vehicle. The laser radar is used to scan the scenario to obtain laser radar point cloud data. The vision camera may be used to take a picture of the scenario.

Figure 2:
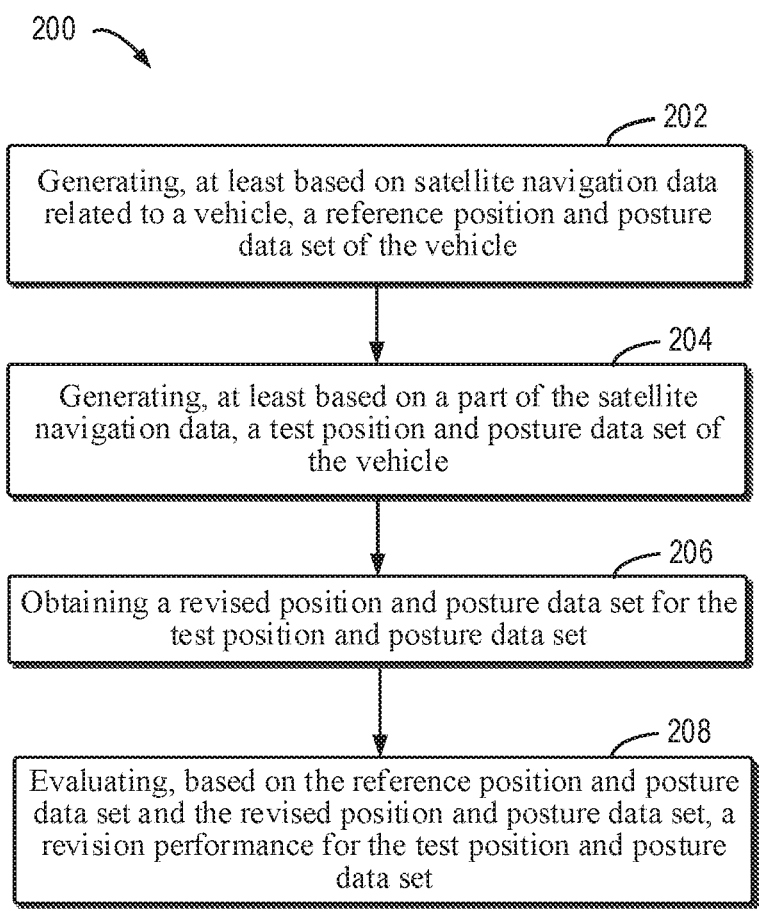
FIG. 2 shows a flowchart of a method 200 for evaluating data according to an embodiment of the present disclosure.

A schematic diagram of an example environment 100 for evaluating data according to an embodiment of the present disclosure is described above with reference to FIG. 1. A flowchart of an example method 200 for positioning according to an embodiment of the present disclosure will be described in detail below with reference to FIG. 2. For example, the method 200 may be performed by the computing device 104 shown in FIG. 1. Each operation of the method 200 will be described in detail below with reference to FIG. 1. It should be understood that the method 200 may also include additional operations not shown and/or the operations shown may be omitted. The scope of the present disclosure is not limited in this respect.

At block 202, the computing device 104 generates, at least based on satellite navigation data related to a vehicle, a reference position and posture data set of the vehicle. The satellite navigation data used by the computing device 104 is generally obtained by a collection vehicle from a scenario with good GNSS signals. The environment with good GNSS signals is generally a space without obstructions, for example, an open urban street, including various traffic signs and the like. Alternatively or additionally, the collection vehicle is also provided with an inertial measurement unit and a wheel speedometer. The inertial measurement unit is used to obtain inertial measurement unit data of the collection vehicle, including acceleration and angular velocity. The wheel speedometer is used to obtain data related to the speed of the vehicle.

The satellite navigation data 103 related to the vehicle, inertial measurement unit data, and wheel speedometer data obtained by the collection vehicle are provided to the computing device 104. The computing device 104 fuses the satellite navigation data 103, the inertial measurement unit data, and the wheel speedometer data to generate the reference position and posture data set of the vehicle. The satellite navigation data, the inertial measurement unit data, and the wheel speedometer data may be fused by a conventional data fusion algorithm to obtain the reference position and posture data set of the vehicle in a good GNSS environment.

In some embodiments, the collection vehicle also obtains laser radar point cloud data or an image of the scenario through a laser radar/vision camera. The obtained laser radar point cloud data or image may be used to generate a high-definition map.

At block 204, the computing device 104 generates, at least based on a part of the satellite navigation data, a test position and posture data set of the vehicle, the accuracy of the test position and posture data set being lower than the accuracy of the reference position and posture data set. The computing device 104 selects data of part of satellites from the satellite navigation data 103 to form part of satellite navigation data to simulate GNSS signals in an obscured scenario, that is, deletes the other part of satellite data from the satellite navigation data 103.

The data of part of satellites may be selected or deleted from the satellite navigation data 103 based on carrier-to-noise ratios and satellite altitude angles from the satellite signals.

In some embodiments, GNSS data of some satellites are randomly selected based on the carrier-to-noise ratios. In some embodiments, data of some satellites in the GNSS data is removed or selected based on the carrier-to-noise ratios from small to large or large to small. In some embodiments, data of some satellites is randomly selected from the GNSS data based on the satellite altitude angles. In some embodiments, part of the satellite data is selected or deleted based on the order of the satellite height angles from large to small or small to large. The example is only used to describe the present disclosure, but not to specifically limit the present disclosure.

At block 206, the computing device 104 obtains a revised position and posture data set for the test position and posture data set. The computing device 104 sends the generated test position and posture data set to the data revising apparatus 105. The data revising apparatus 105 revises the test position and posture data set to generate the revised position and posture data set. The data revising apparatus 105 then sends the revised position and posture data set to the computing device 104.

In some embodiments, the data revising apparatus 105 is a cartography application, which revises the input laser radar point cloud data while revising the position and posture data. The revision capability of the cartography application may be tested by testing the degree of revision of the position and posture data.

At block 208, the computing device 104 evaluates, based on the reference position and posture data set and the revised position and posture data set, a revision performance for the test position and posture data set. The process of evaluating the revision performance for the test position and posture data set will be described in detail in FIG. 3 below.

Through the above method, test GNSS signals of a poor environment may be directly simulated by reference GNSS signals obtained from a scenario with a good GNSS environment, and then the revised position and posture data set is compared with the reference position and posture data set to determine the revision capability of the data revising apparatus. This method not only avoids using a variety of devices to test a high-precision map, but also may quickly detect the revision capability of the revising apparatus.

Figure 3:
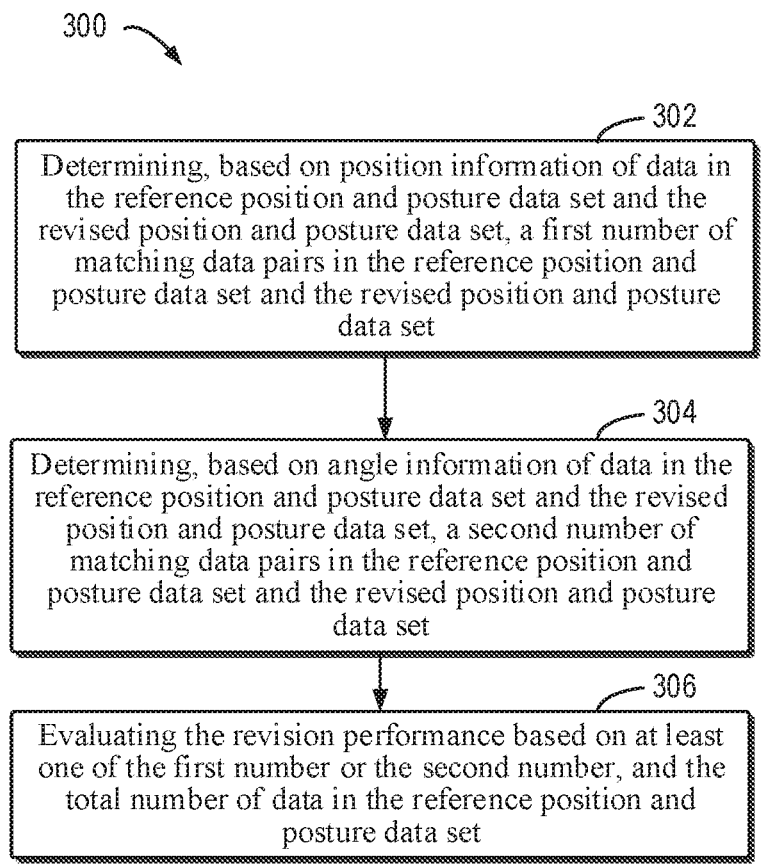
FIG. 3 shows a flowchart of a method 300 for evaluating data according to an embodiment of the present disclosure.

A flowchart of a method 200 for evaluating data according to an embodiment of the present disclosure is described above with reference to FIG. 2. The process of evaluating the revision performance for the test position and posture data set at block 208 in FIG. 2 will be described in detail below with reference to FIG. 3. FIG. 3 shows a flowchart of a method 300 for evaluating data according to an embodiment of the present disclosure.

As shown in FIG. 3, at block 302, the computing device 104 determines, based on position information of data in the reference position and posture data set and the revised position and posture data set, a first number of matching data pairs in the reference position and posture data set and the revised position and posture data set.

When the performance of the data revising apparatus 105 is evaluated, the data in the reference position and posture data set and the revised position and posture data set needs to be compared. In some embodiments, the comparison of data is based on time, that is, the reference position and posture data at certain time in the reference position and posture data set is compared with the data at the same time in the revised position and posture data set.

In some embodiments, based on position information of first data in the reference position and posture data set and position information of corresponding second data in the revised position and posture data set, a distance between a first position corresponding to the first data and a second position corresponding to the second data is determined. During the comparison, the position information of the data in the reference position and posture data set and the revised position and posture data set may be compared, that is, the spatial distance between the first position represented by the reference position and posture data and the second position represented by the corresponding revised position and posture data is compared.

If the spatial distance between the two data is smaller than a threshold distance, it is determined that the first data and the second data are a matching data pair. For example, if the spatial distance between the spatial positions represented by the two data is less than 10 cm, 20 cm, or 30 cm, the two data are considered to match. Therefore, the first number of matching data pairs in the reference position and posture data set and the revised position and posture data set can be determined.

At block 304, the computing device 104 determines, based on angle information of data in the reference position and posture data set and the revised position and posture data set, a second number of matching data pairs in the reference position and posture data set and the revised position and posture data set.

In some embodiments, based on angle information of third data in the reference position and posture data set and angle information of corresponding fourth data in the revised position and posture data set, a difference between at least one angle associated with the third data and at least one corresponding angle associated with the fourth data is determined. During comparison, the reference position and posture data and the revised position and posture data at a given time are also compared to determine the difference between the posture angles of the data. There are three components in the posture data, including roll angle, pitch angle, and yaw angle. In some embodiments, the difference between respective corresponding components may be compared. In some other embodiments, only one or two components in the posture data may be compared.

If the difference in angle is smaller than a threshold angle, it may be determined that the third data and the fourth data are a matching data pair. For example, the threshold angle is 1 degree. In an example, when the differences in roll, pitch and yaw angles of the reference position and posture data and the revised position and posture data are all within 1 degree, the two data are considered to match. In another example, when the difference in the yaw angle of the reference position and posture data and the revised position and posture data is within 1 degree, the two data are considered to match. The examples are only used to describe the present disclosure, but not to specifically limit the present disclosure.

At block 306, the computing device 104 evaluates the correction performance based on at least one of the first number or the second number, and the total number of data in the reference position and posture data set.

After the matching first number is determined from the position information of the data, a first ratio of the matching first number to the total number of data in the reference position and posture data set may be determined. A second ratio of the matching second number to the total number may also be determined. The correction performance is then determined based on at least one of the two ratios.

In some embodiments, the revision capability may be determined based on a ratio of the first number to the total number. For example, if the number of data whose differences between the spatial positions of data in the revised position and posture data set and the spatial positions of corresponding data in the reference position and posture data set are within 30 cm accounts for 90% of the total number, the data revising apparatus 105 is considered to have relatively good revision capability.

In some embodiments, the correction capability may be determined based on a ratio of the second number to the total number. For example, if the number of data whose corresponding differences between three angles of postures of data in the revised position and posture data set and three angles of postures of corresponding data in the reference position and posture data set are all within 1 degree accounts for 99% of the total number, the data revising apparatus 105 is considered to have relatively good revision capability.

In some embodiments, the revision capability may be determined based on both the ratio of the first number to the total number and the ratio of the second number to the total number. For example, in the revised position and posture data set, if the number of data whose distance differences between the spatial positions of data and the spatial positions of corresponding reference position and posture data are within 30 cm accounts for 90% of the total number, and the number of data whose differences in three corresponding angles between the postures of the data and the postures of the corresponding reference position and posture data are all within 1 degree accounts for 99% of the total number, the data revising apparatus is considered to have relatively good correction capability.

Through the above method, the revision capability of the data revising apparatus may be quickly evaluated by comparing the ratio of the number of matching data in the reference position and posture data set and the revised position and posture data set to the total number, which saves the processing time and improves the efficiency of evaluation.

Figure 4:
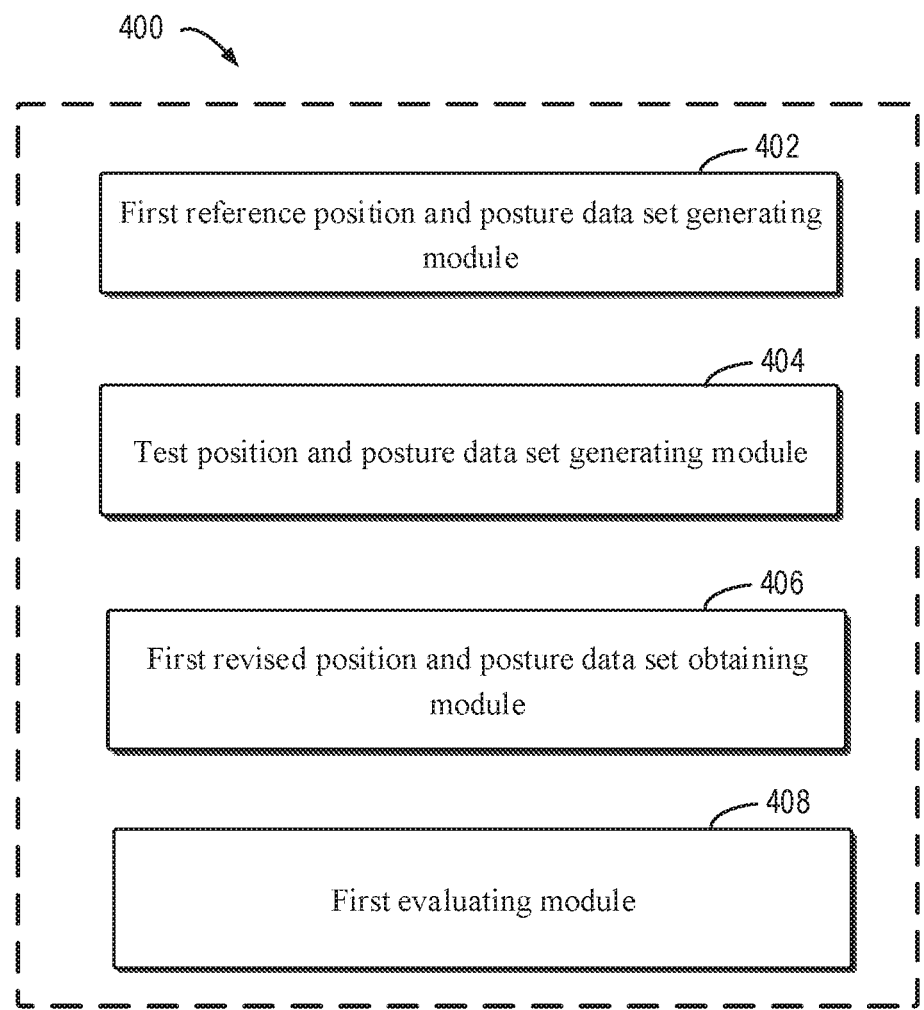
FIG. 4 shows a schematic block diagram of an apparatus 400 for evaluating data according to an embodiment of the present disclosure.

FIG. 4 shows a schematic block diagram of an apparatus 400 for evaluating data according to an embodiment of the present disclosure. As shown in FIG. 4, the apparatus 400 may include a first reference position and posture data set generating module 402, configured to generate, at least based on satellite navigation data related to a vehicle, a reference position and posture data set of the vehicle. The apparatus 400 may further include a test position and posture data set generating module 404, configured to generate, at least based on a part of the satellite navigation data, a test position and posture data set of the vehicle, accuracy of the test position and posture data set being lower than that of the reference position and posture data set. The apparatus 400 may further include a first revised position and posture data set obtaining module 406, configured to obtain a revised position and posture data set for the test position and posture data set. The apparatus 400 may further include a first evaluating module 408, configured to evaluate, based on the reference position and posture data set and the revised position and posture data set, a correction performance for the test position and posture data set.

In some embodiments, the first reference position and posture data set generating module 402 includes: an inertial measurement unit data and wheel speedometer data obtaining module, configured to obtain inertial measurement unit data and wheel speedometer data related to the vehicle; and a second reference position and posture data set generating module, configured to generate the reference position and posture data set of the vehicle based on the satellite navigation data, the inertial measurement unit data, and the wheel speedometer data.

In some embodiments, the test position and posture data set generating module 404 includes a selecting module, configured to select the part of the satellite navigation data based on at least one of carrier-to-noise ratios or satellite altitude angles.

In some embodiments, the first revised position and posture data set obtaining module 406 includes: a sending module, configured to send the test position and posture data set to a data revising apparatus; and a second revised position and posture data set obtaining module, configured to obtain the revised position and posture data set from the data revising apparatus.

In some embodiments, the first evaluating module 408 includes: a first number determining module, configured to determine, based on position information of data in the reference position and posture data set and the revised position and posture data set, a first number of matching data pairs in the reference position and posture data set and the revised position and posture data set; a second number determining module, configured to determine, based on angle information of data in the reference position and posture data set and the revised position and posture data set, a second number of matching data pairs in the reference position and posture data set and the revised position and posture data set; and a second evaluating module, configured to evaluate the revision performance based on at least one of the first number or the second number, and the total number of data in the reference position and posture data set.

In some embodiments, the first number determining module includes: a distance determining module, configured to determine, based on position information of first data in the reference position and posture data set and position information of corresponding second data in the revised position and posture data set, a distance between a first position corresponding to the first data and a second position corresponding to the second data; and a first matching data pair determining module, configured to determine, in response to the distance being smaller than a threshold distance, that the first data and the second data are a matching data pair.

In some embodiments, the second number determining module includes: a difference determining module, configured to determine, based on angle information of third data in the reference position and posture data set and angle information of corresponding fourth data in the revised position and posture data set, a difference between at least one angle associated with the third data and at least one corresponding angle associated with the fourth data; and a second matching data pair determining module, configured to determine, in response to the difference being smaller than a threshold angle difference, that the third data and the fourth data are a matching data pair.

Figure 5:
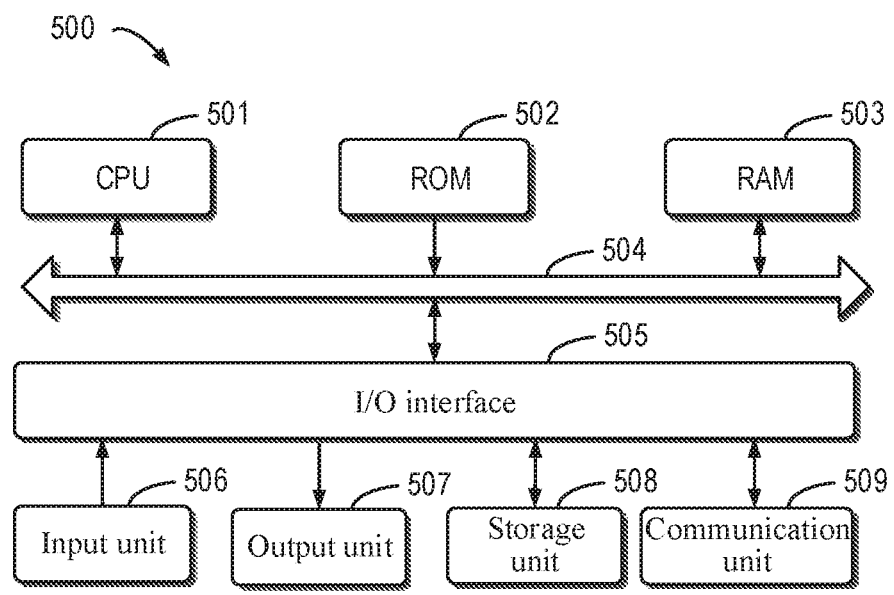
FIG. 5 shows a block diagram of a computing device 500 capable of implementing multiple embodiments of the present disclosure.

FIG. 5 shows a schematic block diagram of an exemplary device 500 capable of implementing various embodiments of the present disclosure. The device 500 may be used to implement the computing device 104 as shown in FIG. 1. As shown in the figure, the device 500 includes a computing unit 501 that may perform various appropriate actions and processing in accordance with computer program instructions stored in a read only memory (ROM) 502 or computer program instructions loaded into a random access memory (RAM) 503 from a storage unit 508. In the RAM 503, various programs and data required for the operation of the device 500 may also be stored. The computing unit 501, the ROM 502, and the RAM 503 are connected to each other through a bus 504. An input/output (I/O) interface 505 is also coupled to the bus 504.

A plurality of components in the device 500 are coupled to the I/O interface 505, including: an input unit 506, such as a keyboard or a mouse; an output unit 507, such as various types of displays, or speakers; the storage unit 508, such as a disk or an optical disk; and a communication unit 509 such as a network card, a modem, or a wireless communication transceiver. The communication unit 509 allows the device 500 to exchange information/data with other devices over a computer network such as the Internet and/or various telecommunication networks.

The computing unit 501 may be a variety of general-purpose and/or dedicated processing components with processing and computing capabilities. Some examples of the computing unit 501 include, but are not limited to, a central processing unit (CPU), a graphics processing unit (GPU), various specialized artificial intelligence (AI) computing chips, various computing units that run machine learning model algorithms, a digital signal processor (DSP), and any suitable processor, controller, microcontroller, etc. The computing unit 501 executes the various methods and processes described above, such as the methods 200 and 300. For example, in some embodiments, the methods 200 and 300 may be implemented as a computer software program that is tangibly contained in a machine readable medium, such as the storage unit 508. In some embodiments, some or all of the computer program may be loaded and/or installed to the device 500 via the ROM 502 and/or the communication unit 509. When the computer program is loaded to the RAM 503 and executed by the computing unit 501, one or more steps of the methods 200 and 300 described above may be executed. Alternatively, in other embodiments, the computing unit 501 may be configured to execute the method 500 by any other suitable means (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A computer-implemented method for evaluating data, comprising:
   generating, at least based on satellite navigation data obtained from a scenario with good Global Navigation Satellite System (GNSS) signals and related to a vehicle, a reference position and posture data set of the vehicle;
   generating, at least based on a part of the satellite navigation data being used to simulate data in a scenario with poor GNSS signals, a test position and posture data set of the vehicle, accuracy of the test position and posture data set being lower than accuracy of the reference position and posture data set;
   obtaining a revised position and posture data set for the test position and posture data set from a data revising apparatus; and
   evaluating, based on the reference position and posture data set and the revised position and posture data set, a revision capability of the data revising apparatus for the test position and posture data set.

2. The method according to claim 1, wherein the generating a reference position and posture data set of the vehicle comprises:
   obtaining inertial measurement unit data and wheel speedometer data related to the vehicle; and
   generating the reference position and posture data set of the vehicle based on the satellite navigation data; the inertial measurement unit data, and the wheel speedometer data.

3. The method according to claim 1, wherein the generating a test position and posture data set of the vehicle comprises:
   selecting the part of the satellite navigation data based on at least one of carrier-to-noise ratios or satellite altitude angles.

4. The method according to claim 1, wherein the obtaining a revised position and posture data set for the test position and posture data set data revising apparatus comprises:
   sending the test position and posture data set to the data revising apparatus; and
   obtaining the revised position and posture data set from the data revising apparatus.

5. The method according to claim 1, wherein the evaluating a revision capability of the data revising apparatus comprises:
   determining, based on position information of data in the reference position and posture data set and the revised position and posture data set, a first number of matching data pairs in the reference position and posture data set and the revised position and posture data set;
   determining, based on angle information of data in the reference position and posture data set and the revised position and posture data set, a second number of matching data pairs in the reference position and posture data set and the revised position and posture data set; and
   evaluating the revision capability of the data revising apparatus based on at least one of the first number or the second number, and total number of data in the reference position and posture data set.

6. The method according to claim 5, wherein the determining a first number comprises:
   determining, based on position information of first data in the reference position and posture data set and position information of corresponding second data in the revised position and posture data set, a distance between a first position corresponding to the first data and a second position corresponding to the second data; and
   determining, in response to the distance being smaller than a threshold distance, that the first data and the second data are a matching data pair.

7. The method according to claim 5, wherein the determining a second number comprises:
   determining, based on angle information of third data in the reference position and posture data set and angle information of corresponding fourth data in the revised position and posture data set, a difference between at least one angle associated with the third data and at least one corresponding angle associated with the fourth data; and
  determining, in response to the difference being smaller than a threshold angle difference, that the third data and the fourth data are a matching data pair.

8. An apparatus for evaluating data, comprising:
at least one processor; and
a memory storing instructions, wherein the instructions when executed by the at least one processor, cause the at least one processor to perform operations, the operations comprising:
  generating, at least based on satellite navigation data obtained from a scenario with good Global Navigation Satellite System (GNSS) signals and related to a vehicle, a and posture data set of the vehicle;
  generating, at least based on a part of the satellite navigation data used to simulate data in a scenario with poor GNSS signals, a test position and posture data set of the vehicle, accuracy of the test position and posture data set being lower than accuracy of the reference position and posture data set;
  obtaining a revised position and posture data set for the test position and posture data set from a data revising apparatus; and
  evaluating, based on the reference position and posture data set and the revised position and posture data set, a revision capability of the data revising apparatus for the test position and posture data set.

9. The apparatus according to claim 8, wherein the generating a reference position and posture data set of the vehicle comprises:
  obtaining inertial measurement unit data and wheel speedometer data related to the vehicle; and
  generating the reference position and posture data set of the vehicle based on the satellite navigation data, the inertial measurement unit data, and the wheel speedometer data.

10. The apparatus according to claim 8, wherein the generating a test position and posture data set of the vehicle comprises:
  selecting the part of the satellite navigation data based on at least one of carrier-to-noise ratios or satellite altitude angles.

11. The apparatus according to claim 8, wherein the obtaining a revised position and posture data set for the test position and posture data set from a data revising apparatus comprises:
  sending the test position and posture data set to the data revising apparatus; and
  obtaining the revised position and posture data set from the data revising apparatus.

12. The apparatus according to claim 8 wherein the evaluating a revision capability of the data revising apparatus comprises:
  determining, based on position information of data in the reference position and posture data set and the revised position and posture data set, a first number of matching data pairs in the reference position and posture data set and the revised position and posture data set;
  determining, based on angle information of data in the reference position and posture data set and the revised position and posture data set, a second number of matching data pairs in the reference position and posture data set and the revised position and posture data set; and
  evaluating the revision capability of the data revising apparatus based on at least one of the first number or the second number, and total number of data in the reference position and posture data set.

13. The apparatus according to claim 12, wherein the determining a first number comprises:
  determining, based on position information of first data in the reference position and posture data set and position information of corresponding second data in the revised position and posture data set, a distance between a first position corresponding to the first data and a second position corresponding to the second data; and
  determining, in response to the distance being smaller than a threshold distance, that the first data and the second data are a matching data pair.

14. The apparatus according to claim 12, wherein the determining a second number comprises:
  determining, based on angle information of third data in the reference position and posture data set and angle information of corresponding fourth data in the revised position and posture data set, a difference between at least one angle associated with the third data and at least one corresponding angle associated with the fourth data; and
  determining, in response to the difference being smaller than a threshold angle difference, that the third data and the fourth data are a matching data pair.

15. A non-transitory computer-readable storage medium, storing a computer program thereon, wherein when the program is executed by a processor, cause the processor to perform operations, the operations comprising:
  generating, at least based on satellite navigation data obtained from a scenario with good Global Navigation Satellite System (GNSS signals and related to a vehicle, a reference position and posture data set of the vehicle;
  generating, at least based on a part of the satellite navigation data being used to simulate data in a scenario with poor GNSS signals, a test position and posture data set of the vehicle, accuracy of the test position and posture data set being lower than accuracy of the reference position and posture data set;
  obtaining a revised position and posture data set for the test position and posture data set from a data revising apparatus; and
  evaluating, based on the reference position and posture data set and the revised position and posture data set, a revision capability for the test position and posture data set.

16. The non-transitory computer-readable storage medium according to claim 15, wherein the generating a reference position and posture data set of the vehicle comprises:
  obtaining inertial measurement unit data and wheel speedometer data related to the vehicle; and
  generating the reference position and posture data set of the vehicle based on the satellite navigation data, the inertial measurement unit data, and the wheel speedometer data.

17. The non-transitory computer-readable storage medium according to claim 15, wherein the generating a test position and posture data set of the vehicle comprises:
  selecting the part of the satellite navigation data based on at least one of carrier-to-noise ratios or satellite altitude angles.

18. The non-transitory computer-readable storage medium according to claim 15, wherein the obtaining a revised position and posture data set for the test position and posture data set from the data revising apparatus comprises:
   sending the test position and posture data set to the data revising apparatus; and
   obtaining the revised position and posture data set from the data revising apparatus.

19. The non-transitory computer-readable storage medium according to claim 15, wherein the evaluating a revision capability of the data revising apparatus comprises:
   determining, based on position information of data in the reference position and posture data set and the revised position and posture data set, a first number of matching data pairs in the reference position and posture data set and the revised position and posture data set;
   determining, based on angle information of data in the reference position and posture data set and the revised position and posture data set, a second number of matching data pairs in the reference position and posture data set and the revised position and posture data set; and
   evaluating the revision capability of the data revising apparatus based on at least one of the first number or the second number, and total number of data in the reference position and posture data set.

20. The non-transitory computer-readable storage medium according to claim 19, wherein the determining a first number comprises:
   determining, based on position information of first data in the reference position and posture data set and position information of corresponding second data in the revised position and posture data set, a distance between a first position corresponding to the first data and a second position corresponding to the second data; and
   determining, in response to the distance being smaller than a threshold distance, that the first data and the second data are a matching data pair.

* * * * *